United States Patent
Bazzi et al.

(10) Patent No.: US 9,954,624 B2
(45) Date of Patent: Apr. 24, 2018

(54) ANGLE-BASED SPEED ESTIMATION OF ALTERNATING CURRENT MACHINES UTILIZING A MEDIAN FILTER

(71) Applicant: The Board of Trustees of the University of Illinois, Urbana, IL (US)

(72) Inventors: Ali M. Bazzi, Vernon, CT (US); Philip T. Krein, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 870 days.

(21) Appl. No.: 13/836,924

(22) Filed: Mar. 15, 2013

(65) Prior Publication Data
US 2013/0289934 A1    Oct. 31, 2013

Related U.S. Application Data

(60) Provisional application No. 61/639,152, filed on Apr. 27, 2012.

(51) Int. Cl.
*G01P 3/44*    (2006.01)
*H04B 11/00*    (2006.01)
(Continued)

(52) U.S. Cl.
CPC ............. *H04B 11/00* (2013.01); *G01P 3/44* (2013.01); *H02P 21/18* (2016.02); *H02P 21/26* (2016.02)

(58) Field of Classification Search
CPC .... H02P 21/146; H02P 21/14; H02P 21/0039; H02P 21/18; H02P 6/185; H02P 6/18;
(Continued)

(56) References Cited

U.S. PATENT DOCUMENTS 4,777,422 A * 10/1988 Slicker ................. H02P 21/141
                                                318/800
5,334,923 A *  8/1994 Lorenz .................... H02P 6/187
                                                318/805

(Continued)

OTHER PUBLICATIONS

Karl, W.C.; et al. "Applications of Rank-Based Filters in Power Electronics," IEEE Transactions on Power Electronics, 7, 1992, (3), pp. 437-443.

*Primary Examiner* — Jeffrey Aiello
(74) *Attorney, Agent, or Firm* — Benesch, Friedlander, Coplan & Aronoff LLP

(57) ABSTRACT

A computer-implemented method for estimating a rotor speed of an alternating current (AC) machine is provided. The method includes determining a stator flux signal based on signals of voltage and current inputs to the AC machine, and determining a rotor flux signal of the AC machine based on the determined stator flux signal. The method includes determining an electrical angle signal based on the determined rotor flux signal, and deriving an electrical frequency signal from the determined electrical angle signal. Subsequently, the method includes sampling the derived electrical frequency signal at a predetermined sampling rate, and storing a predetermined number of sample values. The method further includes evaluating a median value of the predetermined set of electrical frequency sample values, determining a slip frequency value of the AC machine, and determining the rotor speed of the AC machine by subtracting the slip frequency value from the electrical frequency median value.

22 Claims, 13 Drawing Sheets

(51) Int. Cl.
*H02P 21/18* (2016.01)
*H02P 21/26* (2016.01)

(58) Field of Classification Search
CPC ....... H02P 21/24; H02P 21/141; B60W 10/00; B60W 2300/00; B60L 2240/421; B60L 15/025; Y02T 10/644
USPC .......... 318/400.02, 400.33, 400.32; 702/145, 702/147, 151
See application file for complete search history.

(56) References Cited

U.S. PATENT DOCUMENTS

| | | | | |
|---|---|---|---|---|
| 5,548,197 | A * | 8/1996 | Unsworth | H02P 27/026 318/729 |
| 5,638,305 | A * | 6/1997 | Kobayashi | G10K 11/1784 381/71.11 |
| 2001/0017529 | A1* | 8/2001 | Nozari | H02P 6/185 318/808 |
| 2003/0062870 | A1* | 4/2003 | Royak | H02P 6/185 318/727 |
| 2003/0169015 | A1* | 9/2003 | Royak | H02P 21/141 318/727 |
| 2005/0057212 | A1* | 3/2005 | Harbaugh | H02P 21/0035 318/809 |
| 2005/0154545 | A1* | 7/2005 | Ramu | H02P 25/089 702/65 |
| 2011/0006714 | A1* | 1/2011 | Hui | H02P 6/007 318/400.32 |
| 2011/0068724 | A1* | 3/2011 | Henderson | H02P 6/18 318/400.21 |
| 2013/0049661 | A1* | 2/2013 | Cao | H02P 21/146 318/400.34 |
| 2013/0175955 | A1* | 7/2013 | Son | H02P 21/14 318/400.02 |

* cited by examiner

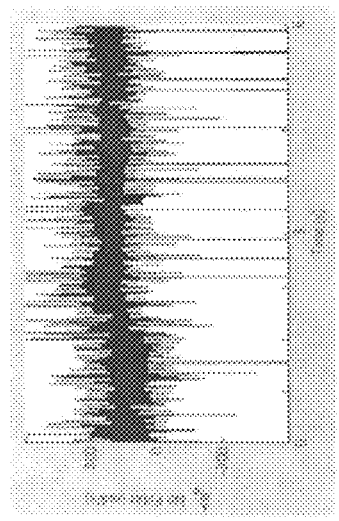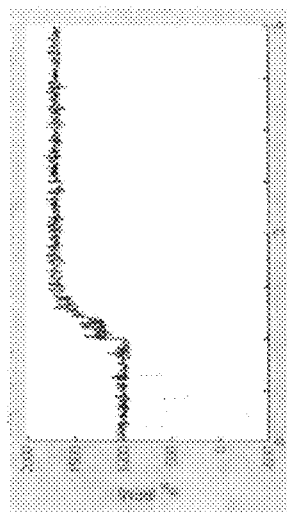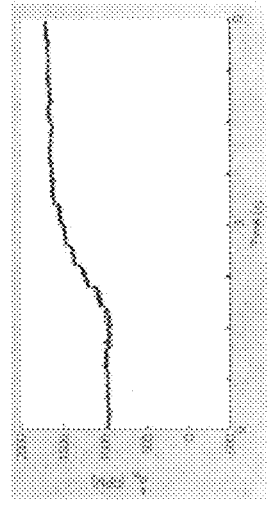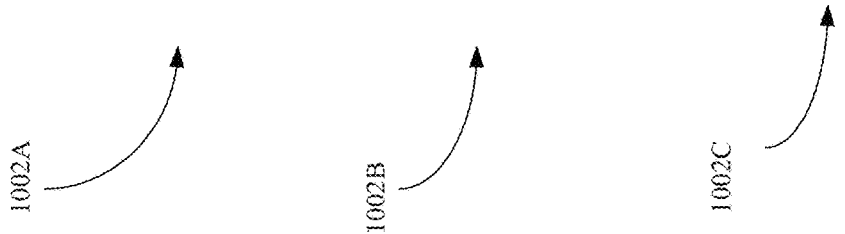
Figure 10A
Figure 10B
Figure 10C

ANGLE-BASED SPEED ESTIMATION OF ALTERNATING CURRENT MACHINES UTILIZING A MEDIAN FILTER

CROSS-REFERENCE TO RELATED APPLICATIONS

The present application claims priority under 35 U.S.C. § 119(e) to U.S. Provisional Patent Application Ser. No. 61/639,152, filed Apr. 27, 2012, which is incorporated herein by reference in its entirety.

BACKGROUND

Unless otherwise indicated herein, the materials described in this section are not prior art to the claims in this application and are not admitted to be prior art by inclusion in this section.

A rotor speed of an alternating current (AC) machine can be measured with physical (hardware) speed sensors, such as speed encoders, tachometers, resolvers, or other position sensors. These physical speed sensors typically require additional information processing to yield information about the rotor speed of an AC machine.

As known to one of ordinary skill in the art, physical speed sensors typically suffer from a lack of reliability due to problems associated with hardware-based failures. With intent to improve reliability of AC machine drives and potentially reduce their costs, speed sensorless approaches have been shown to be valuable in applications where failures are intolerable. Applications of these speed sensorless approaches typically include electric and hybrid vehicles, ship propulsion systems, and aerospace applications.

Speed sensorless approaches may involve linear and nonlinear control and estimation theories to create speed estimators that avoid the need for physical speed sensors. These speed estimators typically involve Kalman filtering systems, model reference adaptive systems, Luenberger observer systems, and others. However, these speed estimators suffer from implementation complexity.

SUMMARY

Disclosed herein are improved methods, systems, and devices for providing angle-based speed estimations of AC machines utilizing a median filter.

In one embodiment, a computer-implemented method for estimating a rotor speed of an alternating current (AC) machine is provided. The method includes determining a stator flux signal based on signals of voltage and current inputs to the AC machine, and determining a rotor flux signal of the AC machine based on the determined stator flux signal. The method further includes determining an electrical angle signal based on the determined rotor flux signal, and deriving an electrical frequency signal from the determined electrical angle signal. Subsequently, the method includes sampling the derived electrical frequency signal at a predetermined sampling rate, and storing a predetermined number of sample values. The method further includes evaluating a median value of the predetermined set of electrical frequency sample values, determining a slip frequency value of the AC machine, and determining the rotor speed of the AC machine by subtracting the slip frequency value from the electrical frequency median value.

In one aspect, the computer-implemented method further includes evaluating a difference between a result of a product of a stator resistance value with one of the current input signals and one of the voltage input signals to produce a difference signal, performing an integration of the produced difference signal, wherein the integration involves a discrete integrator having a sampling rate and a time delay, filtering using a high-pass filtering unit the integrated difference signal in order to minimize a potential accumulated offset value of the integrated difference signal, filtering the high-pass filtered difference using a low-pass filtering unit to extract a residual offset value from the high-pass filtered difference signal, reducing the high-pass filtered difference signal by subtracting the extracted residual offset value from the high-pass filtered difference signal, and determining the rotor flux signal based on the reduced high-pass filtered difference signal using a rotor flux derivation unit.

In another aspect, a computing system includes one or more computers and one or more storage devices storing instructions that are operable, when executed by the one or more computers, to cause the one or more computers to perform the above discussed method for estimating a rotor speed of an alternating current (AC) machine.

In another aspect, a system, for estimating a rotor speed of an alternating current (AC) machine, includes a coordinate transform unit configured to transform voltage and current signals into equivalent q-axis and d-axis stator current and voltage signals, a rotor-flux estimating unit configured to derive a rotor flux signal based on the equivalent q-axis and d-axis stator current and voltage signal, and an estimating unit configured to determine an electrical angle signal based on the determined rotor flux signal, to derive an electrical frequency signal from the determined electrical angle signal, to sample the derived electrical frequency signal at a predetermined sampling rate, and storing a predetermined number of sample values, to evaluating a median value of the predetermined set of electrical frequency sample values, to determine a slip frequency value of the AC machine, and to determine the rotor speed of the AC machine by subtracting the determined slip frequency value from the evaluated electrical frequency median value.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the invention by way of example only and not by way of limitation.

BRIEF DESCRIPTION OF THE FIGURES

In the figures:

FIG. 10A is a screen shot of an experimental signal waveform of the electrical frequency of the AC machine without filtering;

FIG. 10B is a screen shot of a signal waveform of a measured speed of the AC machine;

FIG. 10C is a screen shot of a signal waveform of the estimated speed of the AC machine using a Median filter;

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In one embodiment, a method for estimating a rotor speed of an AC machine based on an electrical angle of the AC machine is provided. A rotor flux estimation of the AC machine can be used to determine an electrical angle, which is an expected position of an input magnetomotive force imposed on the AC machine, and which is an integral of an electrical frequency of the AC machine. Data of the electrical frequency, derived from the electrical angle, is then filtered via a median filter to remove data spikes that are generated by a periodic resetting of the electrical angle as it varies between $-\pi$ and $\pi$ radians. An estimate of a slip frequency of the AC machine can be determined based on stator current commands. A difference between the electrical frequency and the slip frequency is an estimate of the rotor frequency that is a linear function of the electrical frequency and the mechanical speed of the rotor of the AC machine.

Figure 1:
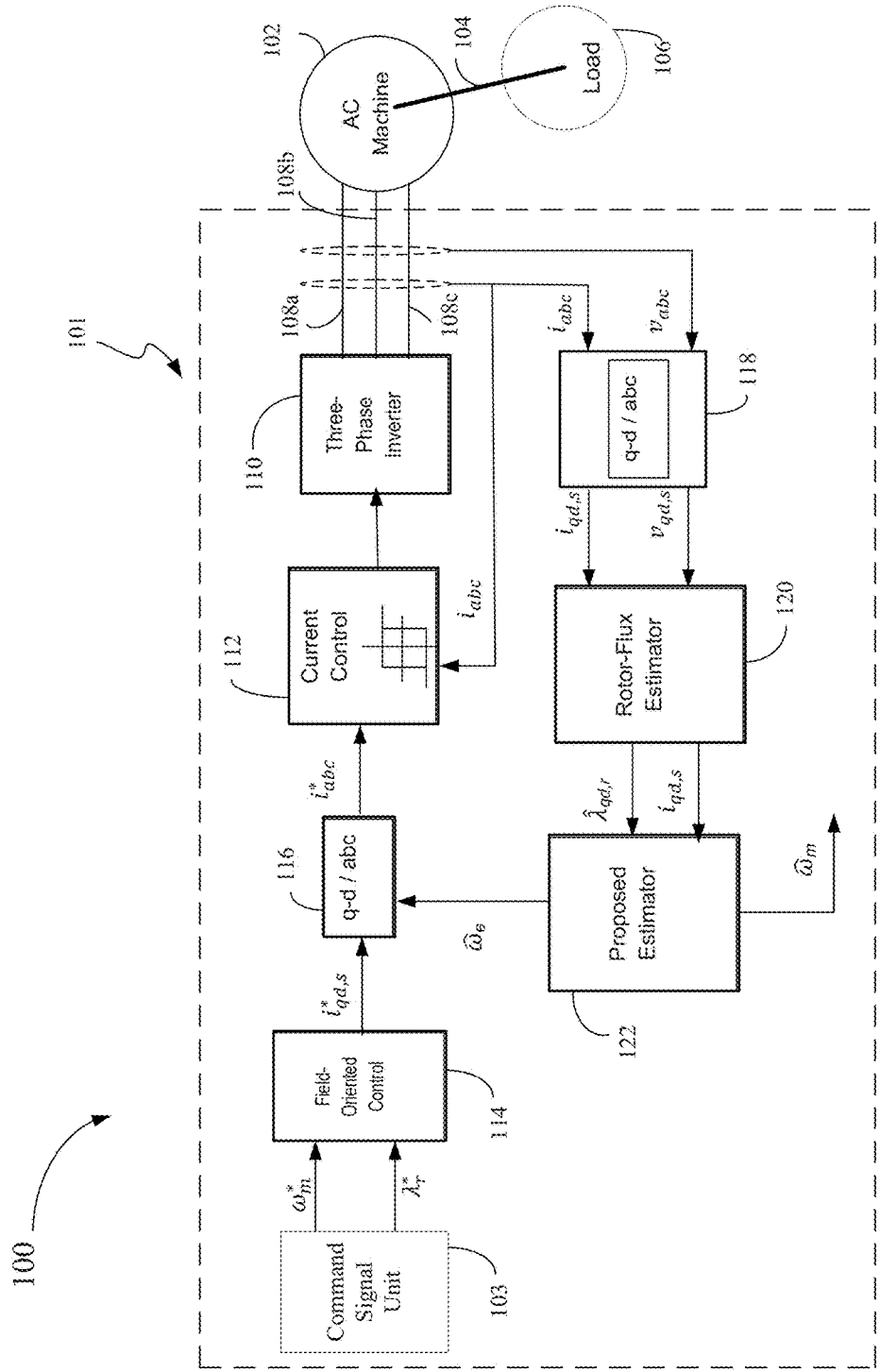
FIG. 1 is a schematic block diagram of an example embodiment of a system for determining an angle-based speed of an alternating current (AC) machine using a median filter.

Now referring to FIG. 1, an example embodiment 100 of a computing system 101 for estimating a rotor speed of an AC machine based on an electrical angle is shown. Computing system 101, hereafter also referred to as speed estimating system, is coupled to an AC machine 102, which is in turn coupled by a shaft 104 to a load 106. AC machine 102 is provided with a balanced polyphase (three phase shown) power on supply lines 108a, 108b, and 108c from a polyphase inverter system 110, which can be constructed in various ways, depending on the requirements for AC machine 102, which can be any of various types of induction machines. Inverter system 110 is configured to receive current signals from a current control unit 112, which in turn receives feedback current signals $I_{abc}$ from inverter system 110 and command current signals $I^*_{abc}$ indirectly from a field-oriented control unit 114. In one embodiment, inverter system 110 provides power for driving AC machine 102 at a desired fundamental drive frequency, which may vary from low frequencies to running frequencies, which are typically in the range of 60 Hz but may also extend up to higher or lower frequencies as needed.

As shown in FIG. 1, a coordinate transform circuit or unit 116 is configured to convert quadratic axis (q-axis) and direct axis (d-axis) command stator current signals $I^*_{qd,s}$, output from field-oriented control unit 114, into equivalent command current signals $I^*_{abc}$. Further, a coordinate transform unit 118 is coupled to a set of voltage and current sensors (not shown) associated with lines 108a, 108b, and 108c that detect or sense voltage signals $V_{abc}$ at the inputs to AC machine 102 and current signals $I_{abc}$ flowing in lines 108a, 108b, and 108c. Coordinate transform unit 118 is configured to transform voltage and current signals $V_{abc}$ and $I_{abc}$ into equivalent q-axis and d-axis stator current and voltage signals $I_{qd,s}$ and $V_{qd,s}$, respectively, and provide them as voltage and current inputs to a rotor-flux estimating unit 120. Alternatively, coordinate transform unit 118 may be integral to rotor-flux estimating unit 120. As known to one of ordinary skill in the art, the current sensors may be Hall Effect sensors, current transformers, or any other suitable current sensors. Rotor-flux estimating unit 120 is configured to use the stator current and voltage signals $I_{qd,s}$ and $V_{qd,s}$, respectively, received from coordinate transform unit 118, to generate and provide an estimate of a rotor flux linkage signal $\hat{\lambda}_{qd,r}$, along with stator current signal $I_{qd,s}$, to a speed estimating unit 122, which in turn is configured to generate estimates of the electrical frequency $\hat{W}_e$ and of the rotor speed $\hat{W}_{*m}$ of AC machine 102.

Figure 2:
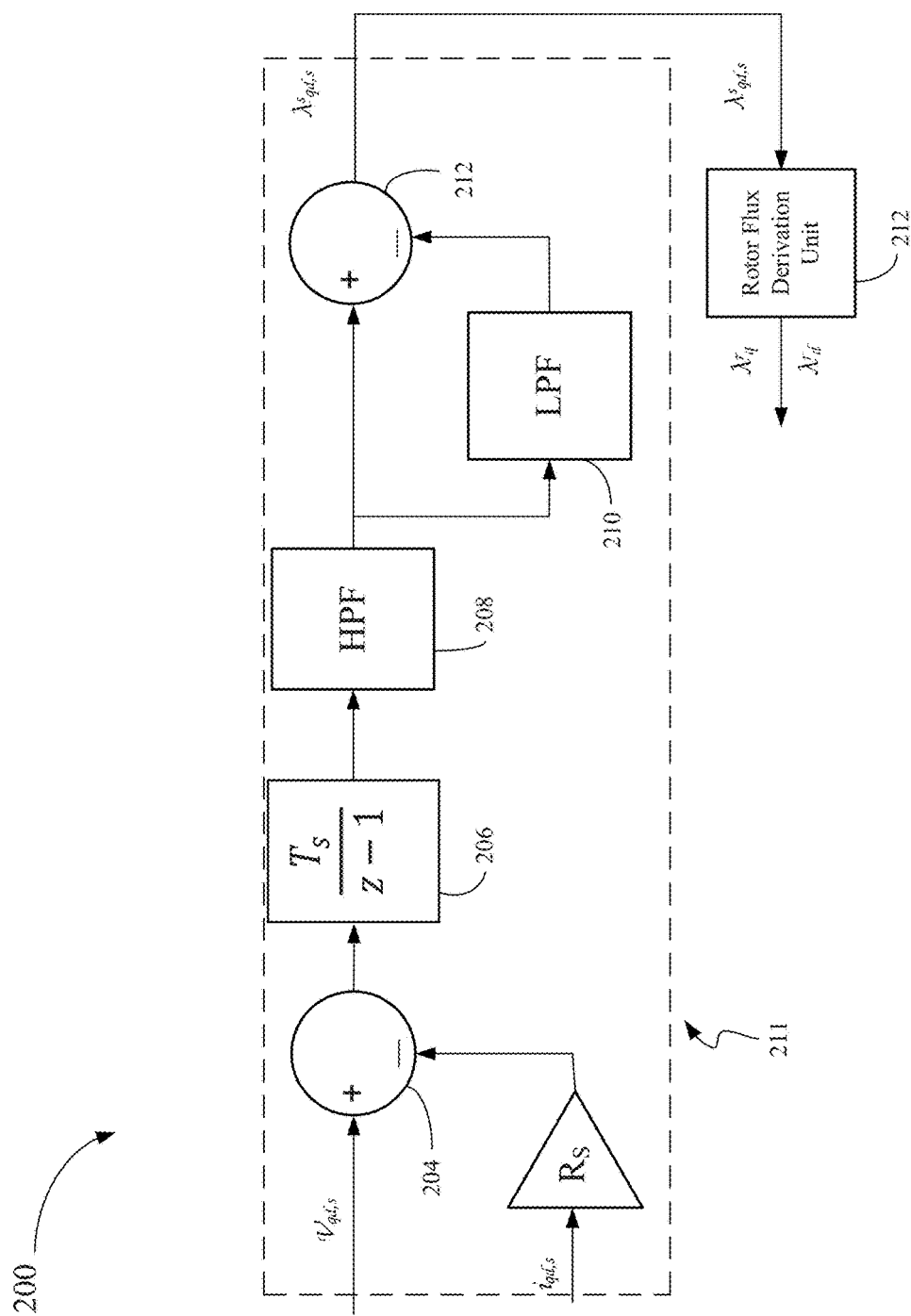
FIG. 2 is a schematic block diagram of an example embodiment of a system for estimating a flux in an AC machine.

Now referring to FIG. 2, an example embodiment of rotor-flux estimating unit 120 is shown. As discussed above in relation to FIG. 1, rotor-flux estimating unit 120 is configured to use stator current and voltage signals $I_{qd,s}$ and $V_{qd,s}$, received from coordinate transform unit 118, to generate estimates of rotor flux linkage signal $\hat{\lambda}_{qd,r}$. In regard to FIG. 2, rotor-flux estimating unit 120, which includes a stator-flux derivation unit 211 and a rotor-flux derivation unit 212, may be a back-electromagnetic force (back-EMF) estimating unit that is configured to evaluate stator and rotor flux linkages $\lambda_{qd}^s$ and $\lambda_{qd}^r$, respectively, as represented by the following equations:

$$\lambda_{qd}^s = \int (V_{qd}^s - R_s I_{qd}^s) dt \qquad \text{Equation 1}$$

$$\lambda_{qd}^r = \frac{L_r}{L_m}(\lambda_{qd}^s - \sigma L_s I_{qd}^s) \qquad \text{Equation 2}$$

where $L_m$, $L_r$, and $L_s$ represent magnetizing, rotor, and stator inductances, respectively, Rs represents a stator resistance, and σ represents a leakage factor of AC machine 102. Moreover, $V_{qd}^s$, $I_{qd}^s$ signals may each have a sinusoidal waveform.

As shown in FIG. 2, during operation, the implementation of Equation 1 may first involve a differentiating unit 204 configured to evaluate a difference between a result of a product of stator resistance Rs with stator current signal $I_{qd}^s$ and stator voltage signal $V_{qd}^s$. Subsequently, an integrating unit 206 is configured to perform an integration of the resulting difference. In one embodiment, integration unit 206 may be a discrete integrator having a sampling rate $T_s$ and a delay z. As known to one of ordinary skill in the art, integrator unit 206 may accumulate an offset value in the integration resulting signal $\lambda_{qd}^s$ due to any offset values present in the $V_{qd}^s$ and $I_{qd}^s$ signals. As such, in order to minimize or mitigate the potentially accumulated offset value, an high-pass filtering (HPF) unit 208 is configured to filter resulting signal $\lambda_{qd}^s$. In some instances, because a residual offset value may remain, a low-pass filtering (LPF) unit 210 may be configured to extract the residual offset value from the high-pass filtered signal $\lambda_{qd}^s$. Subsequently, a differentiating unit 212 is configured to subtract the extracted residual offset value from the high-pass filtered signal $\lambda_{qd}^s$, to generate $\lambda_{qd,s}^s$, which is provided to a rotor flux derivation unit 212 to generate an estimate of a rotor flux linkage $\widehat{\lambda_{qd,r}^r}$, in terms of its direct axis and quadratic axis components $\widehat{\lambda_d^r}$ and $\widehat{\lambda_q^r}$, respectively.

Figure 3:
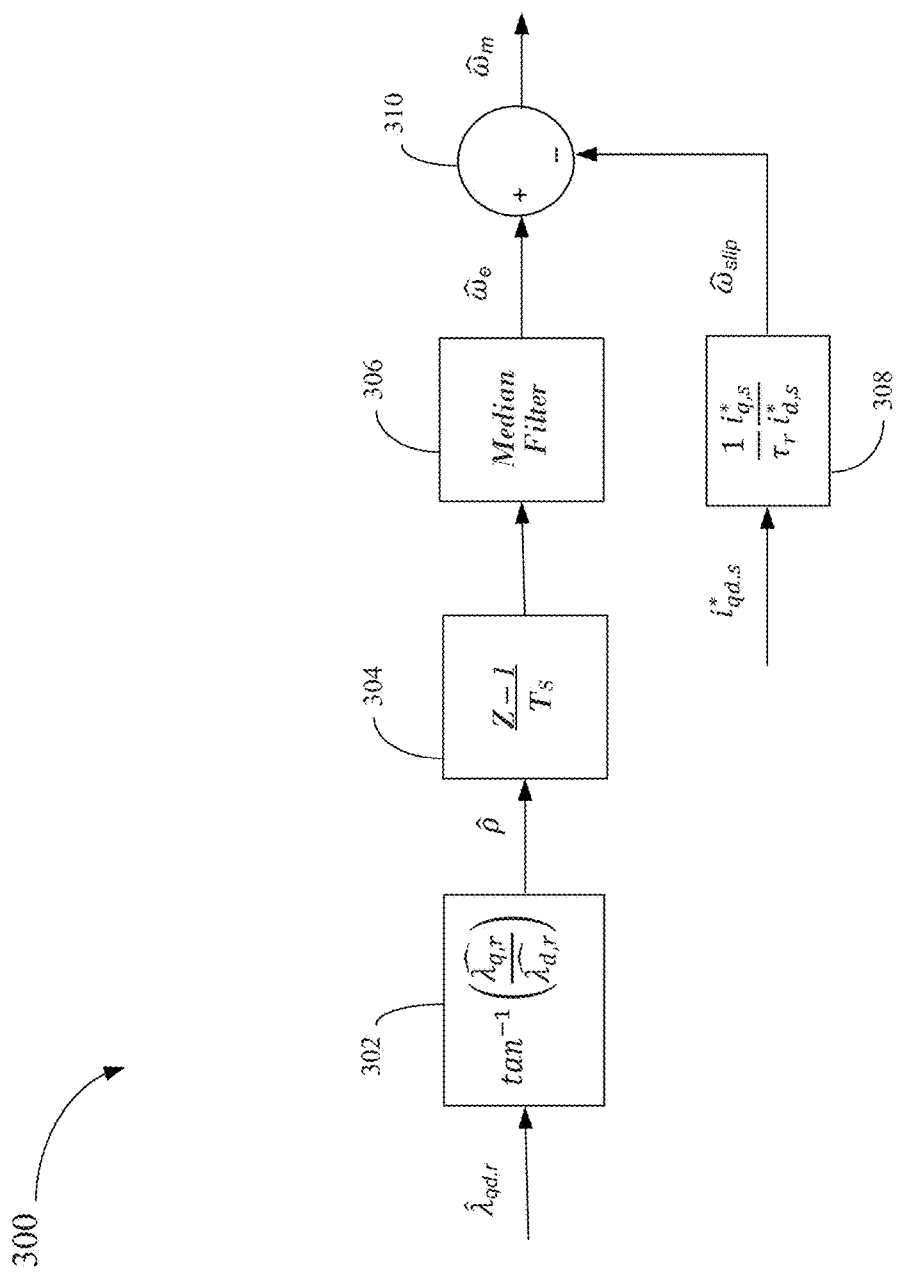
FIG. 3 is a schematic block diagram of an example embodiment of an angle-based speed estimator.

Now referring to FIG. 3, an example embodiment of an angle-based speed estimating unit is shown. As stated above, an electric frequency estimate $\hat{W}_{-e}$ can be derived from an electrical angle estimate $\hat{\rho}$, which in turn can be determined from a phase relationship of the q-axis and d-axis rotor flux linkages $\widehat{\lambda_d^r}$ and $\widehat{\lambda_q^r}$, as follows:

$$\hat{\rho} = \tan^{-1}\left(\frac{\hat{\lambda}_q^r}{\hat{\lambda}_d^r}\right) \qquad \text{Equation 3}$$

As shown in FIG. 3, once determined, electrical angle estimate $\hat{\rho}$ is provided to a mathematical derivation unit or application 304 in order to derive the time-derivative electric frequency estimate $\hat{W}_{-e}$, as follows:

$$\frac{d\hat{\rho}}{dt} = \hat{W}_e \qquad \text{Equation 4}$$

During operation, $\hat{\rho}$ varies between $-\pi$ and $+\pi$ radians and is reset to 0 every $2\pi$ radians. The changes in $\hat{\rho}$ when reset will cause significant spikes in $$\frac{d\hat{\rho}}{dt}.$$

Figure 5:
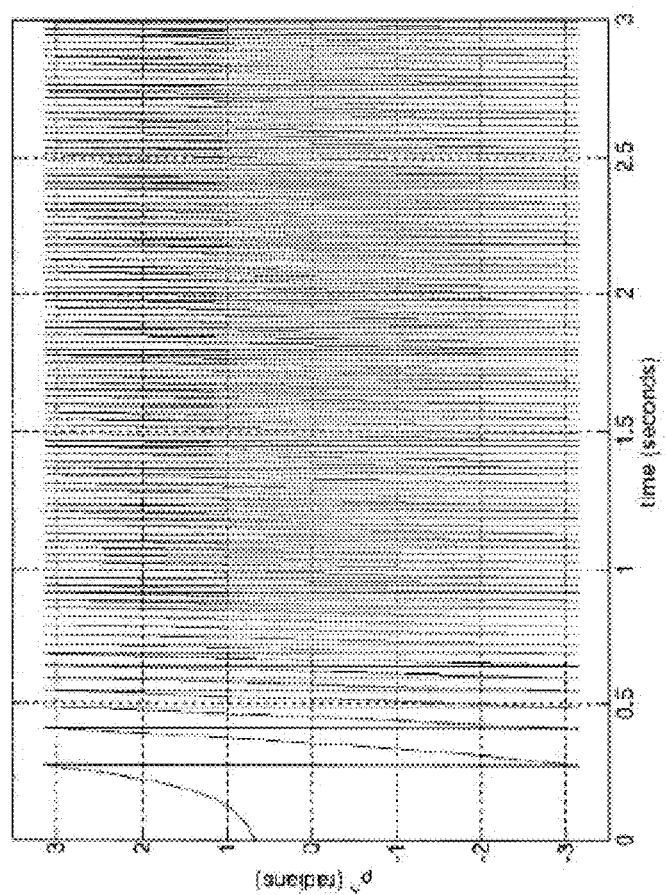
FIG. 5 is a graph illustrating an example embodiment of a signal waveform of an electrical angle extracted from the estimated rotor flux of FIG. 2.

Referring to FIG. 5, a graph 502 illustrating an exemplary simulation result of electrical angle $\hat{\rho}$ for a 4-pole AC induction machine is shown. The constrained range $-\pi < \hat{\rho} < +\pi$ may create a saw-tooth waveform for electrical angle $\hat{\rho}$, as shown in FIG. 5. While this saw-tooth waveform is piece-wise continuous, its time derivative $$\frac{d\hat{\rho}}{dt}$$

tends to infinity (∞) at the reset-related transitions, and may hinder direct computation of the time derivative $$\frac{d\hat{\rho}}{dt}.$$

Figure 6:
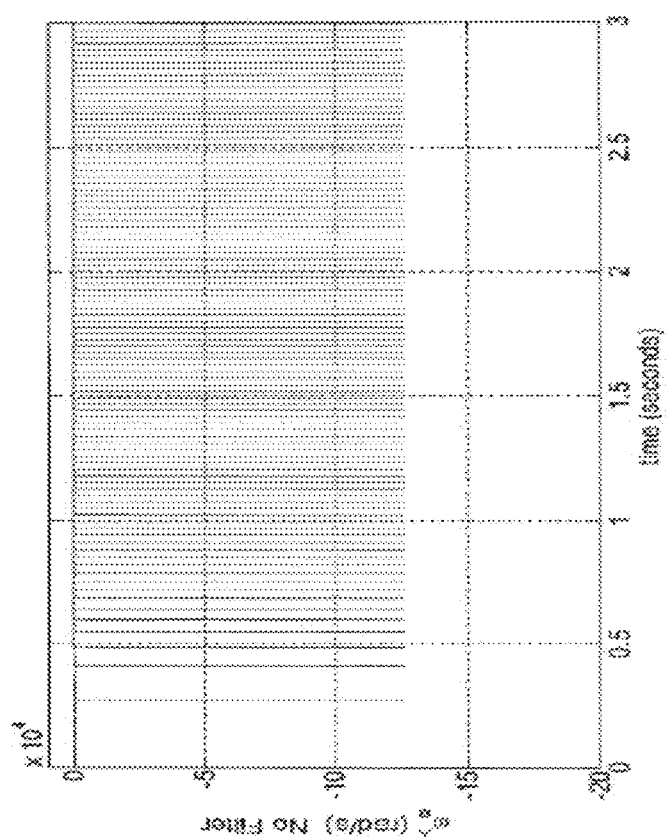
FIG. 6 is a graph illustrating an example embodiment of a signal waveform of an electrical frequency derived from the electrical angle of FIG. 5.
Figure 7:
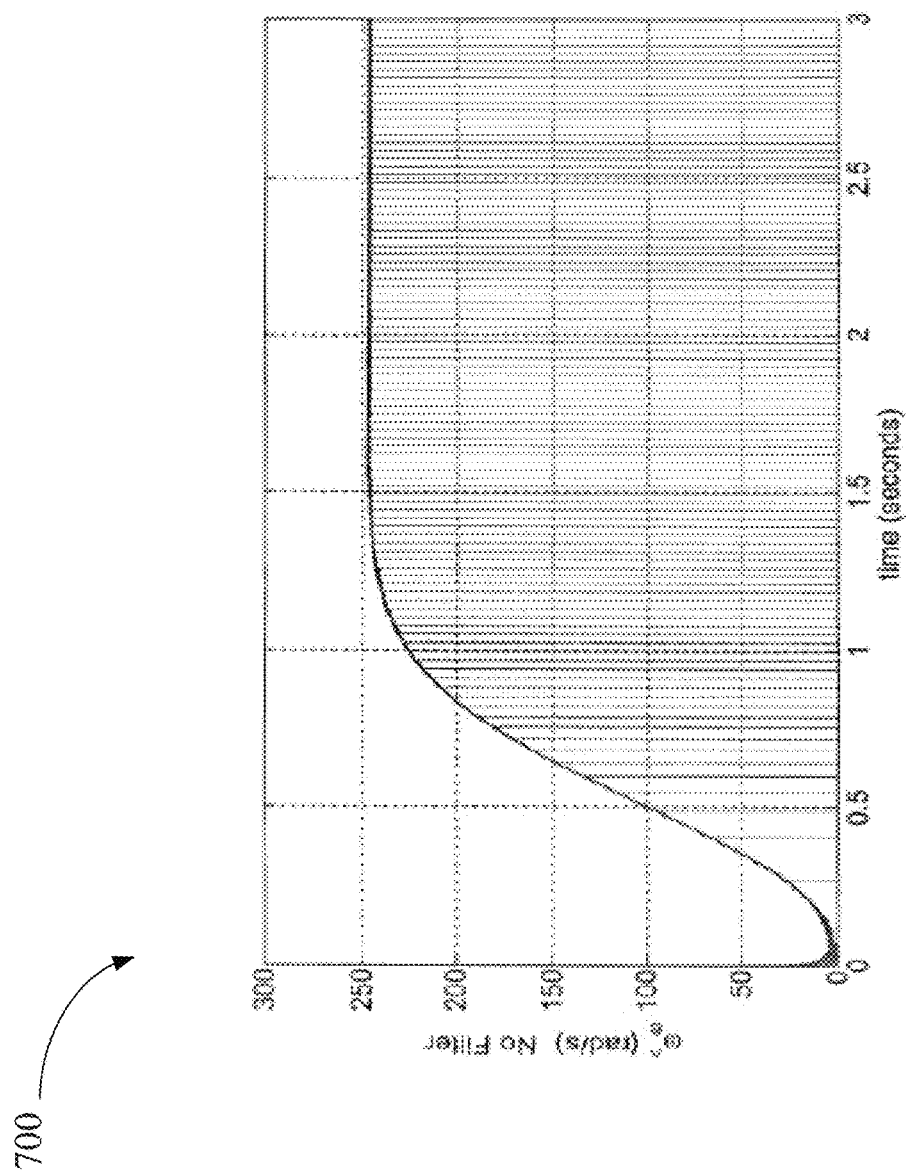
FIG. 7 is a graph illustrating a zoomed view of a signal waveform of an electrical frequency derived from the electrical angle of FIG. 6.

Referring FIG. 7, which illustrates a zoomed view of FIG. 6, a graph 702, illustrating an exemplary simulation result of electrical frequency $\hat{W}_{-e}$, shows that except for the spikes a signal waveform corresponding to electrical frequency $\hat{W}_{-e}$ indicates that the electrical frequency of the AC machine is tracked in a substantially accurate manner.

In order to minimize or mitigate the generated spikes, a median filtering unit 306 is provided to receive the time derivative output signal $\hat{W}_{-e}$ from mathematical derivation application 304. Further, signal $\hat{W}_{-e}$ may be provided to median filtering unit 306 in the form of sequential digital samples. In one embodiment, the $\hat{W}_{-e}$ sequential digital samples are provided via a moving window, which is used to identify a certain number of samples representing the most recent digital sample and a few immediate past digital samples.

Figure 4A:
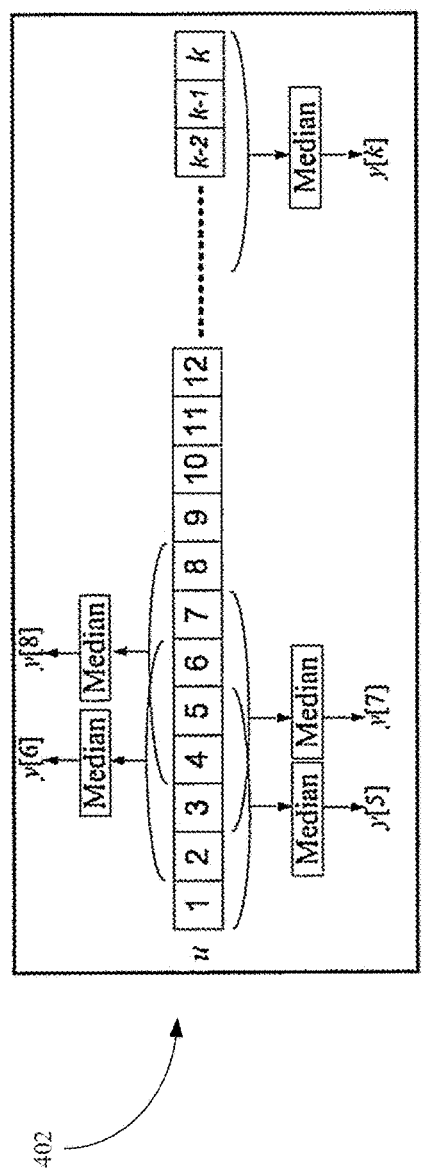
FIG. 4A is a schematic block diagram illustrating of an example embodiment of an operation of median filter.

Now referring to FIG. 4A, an exemplary embodiment 402 of an implementation of a median filtering unit is shown. During operation, a median filter may involve a moving window of N digital samples and corresponding discrete delays, i.e., N is a delay width of the moving window. When sampling an analog or continuous signal u(t) at a sampling rate $T_s$, a discrete signal $u[nT_s]$ can be generated, with n being a sample number. Typical sampling rates in power electronics can exceed tens of kHz to several MHz. The signal u(t) can be corrupted by noise or glitches, and can include an estimation error if estimated from other quantities. With or without any noise or estimation error factoring in $u[nT_s]$, a discrete output $y[nT_s]$ of a median filter with $u[nT_s]$ as input can be presented as follows:

$$y[nT_s] = \text{Median}\{u[nT_s], u[(n-1)T_s], \ldots, u[(n-N+1)T_s]\} \qquad \text{Equation 5}$$

Figure 4B:
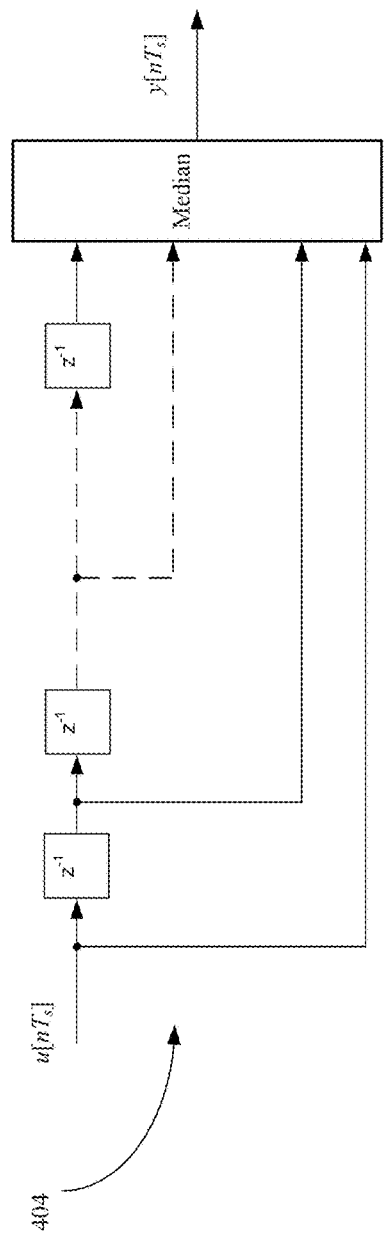
FIG. 4B is a schematic block diagram illustrating of an example embodiment of an implementation of a median filter.

While a median filter can introduce some delay or phase shift of N samples, N can be selected as a small integer number. For example, if the moving window includes N=25 samples and the sampling rate or period $T_s$ is 1 MHz, a total delay from u(t) to y(t) is 13 μs. As shown in FIG. 4A, the delay process may require N stored values of $u[nT_s]$ to $u[(n-N+1)T_s]$. Once $y[nT_s]$ is found, for the next sampling $(n+1)T_s$, $u[(n-N+1)T_s]$ is dropped and $u[(n+1)T_s]$ is added to the moving window to identify $y[(n+1)T_s]$. Since a median sample value y is sought, it is most convenient if N is an odd number. Further, in the event that there is a recurring sample spike, which may be due to periodic noise, glitch or large error, the moving window may be judiciously structured to prevent the recurring spike sample from being selected as one of the discrete input signals $u[nT_s]$ samples. As shown in FIG. 4B, an exemplary implementation 404 of a median filter may involve a delay operator z−1 with a sampling period $T_s$. Moreover, for the first N samples, the median sample values y are initialized to be equal to the digital values of u, and once the number of sample values exceeds N, then a median sample value found in the most recent N sample values u of the moving window can be selected as an output y.

For demonstration purposes in the simulation discussed above, a 7-sample window was employed. One of ordinary skill in the art would recognize that a 7-sample window can reject spikes in the input sample values of electrical frequency $\hat{W}_e$ that do not exceed three samples in width. If even noisier input sample values are expected, a 9-sample or wider window can be employed. If the spikes shown in FIG. 7 were ideal and disturb only a single input sample value, then even a 3-sample window would reject them successfully. In practice, seven or more input sample values are likely to provide good and desirable results.

Figure 8:
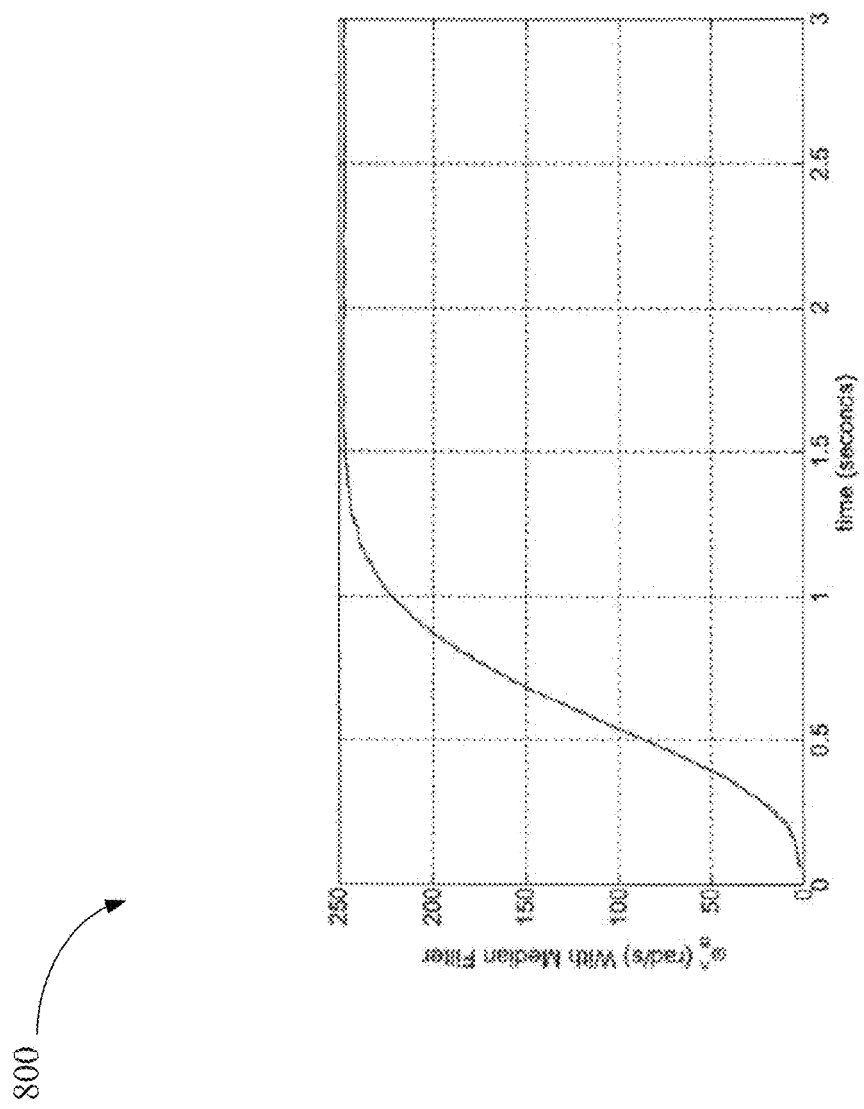
FIG. 8 is a graph illustrating an example embodiment of a signal waveform of the electrical frequency filtered using a median filter to remove spikes shown in FIGS. 6 and 7.

As discussed above in the exemplary implementation, median filtering unit 306 is configured to eliminate spikes where sample values of $$\frac{d\hat{\rho}}{dt}$$

are provided as inputs in order to generate median values as outputs for electrical frequency $\hat{W}_e$, as illustrated by the substantially smooth signal waveform of FIG. 8. Moreover, as shown in FIG. 3, values of electrical frequency $\hat{W}_e$ are then provided to a differentiating unit or application 310 to subtract an estimate of a frequency slip signal $\hat{W}_{slip}$ in order to generate an estimate of a rotor speed value $\hat{W}_m$, i.e., $\hat{W}_m = \hat{W}_e - \hat{W}_{slip}$. As known to one of ordinary skill in the art, a frequency slip estimating unit or application 308 may use input stator current signal $I^*_{qd,s}$ in order to generate as output frequency slip signal $\hat{W}_{slip}$, using the following Equation 6:

$$\hat{W}_{slip} = \frac{1}{\tau_r} \frac{I^*_{q,s}}{I^*_{d,s}} \quad \text{Equation 6}$$

where $\tau_r$ represents a rotor time constant.

Figure 9A:
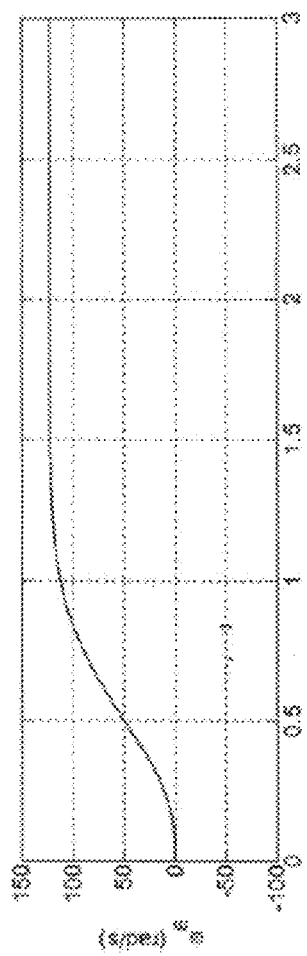
FIG. 9A is a graph illustrating an example embodiment of the signal waveform of a measured speed of the AC machine.
Figure 9B:
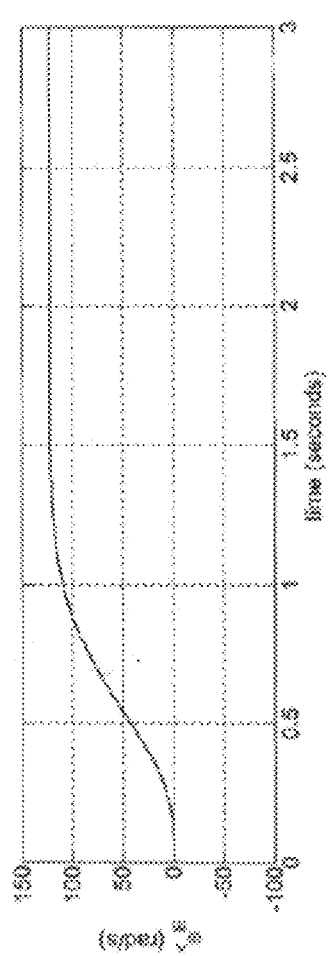
FIG. 9B is a graph illustrating an example embodiment of the signal waveform of an estimated speed of the AC machine.

Now referring to FIGS. 9A and 9B, graphs 902 and 904 illustrate actual (measured) and estimated mechanical simulation speeds $W_m$ and $\hat{W}_m$, respectively. A shown, the two speed curves or traces 902a and 904a are substantially identical, and could be overlaid one each other to show that a difference between them is quite minimal. When implementing a 7-sample filter input, 4-sample values are timewise behind a current output. In a typical AC machine, response times can be on the order of 10 milliseconds (ms). As such, a 4-sample delay may be adequate if the sampling rate $T_s$ is sufficiently higher to make a speed output delay unnoticeable on this response time frame. Thus, a delay limitation may govern or dictate a tradeoff between moving window size and spike mitigation.

Now referring to FIG. 10A, a graph 1002a illustrates an experimental curve of electrical frequency $W_e$ without filtering demonstrating that spikes are generated by the resetting of the electrical angle ρ. FIGS. 10B and 10C shows measured and estimated rotor speed curves 1002b and 1002c, respectively, for a speed step from 1000 revolutions per minute (rpm) to 1750 rpm with the proposed speed estimating system 101 using a 25-sample median filtering unit 306 followed by a low pass filter (not shown), which is configured to reduce other types of noises, such as ripple noise. As shown in FIG. 10C, all spikes have been removed, but the speed estimate $\hat{W}_m$ maintained its expected shape without distortion. Accordingly, median filtering unit 306 is configured to remove impulse or spike noise but does not alter step changes or other types of operational changes. That is, by implementing median filtering unit 306 in the derivation of the speed estimate $\hat{W}_m$, the effect of the discontinuity of electrical angle ρ is mitigated, and the angle-based speed estimation is achieved.

Figure 11:
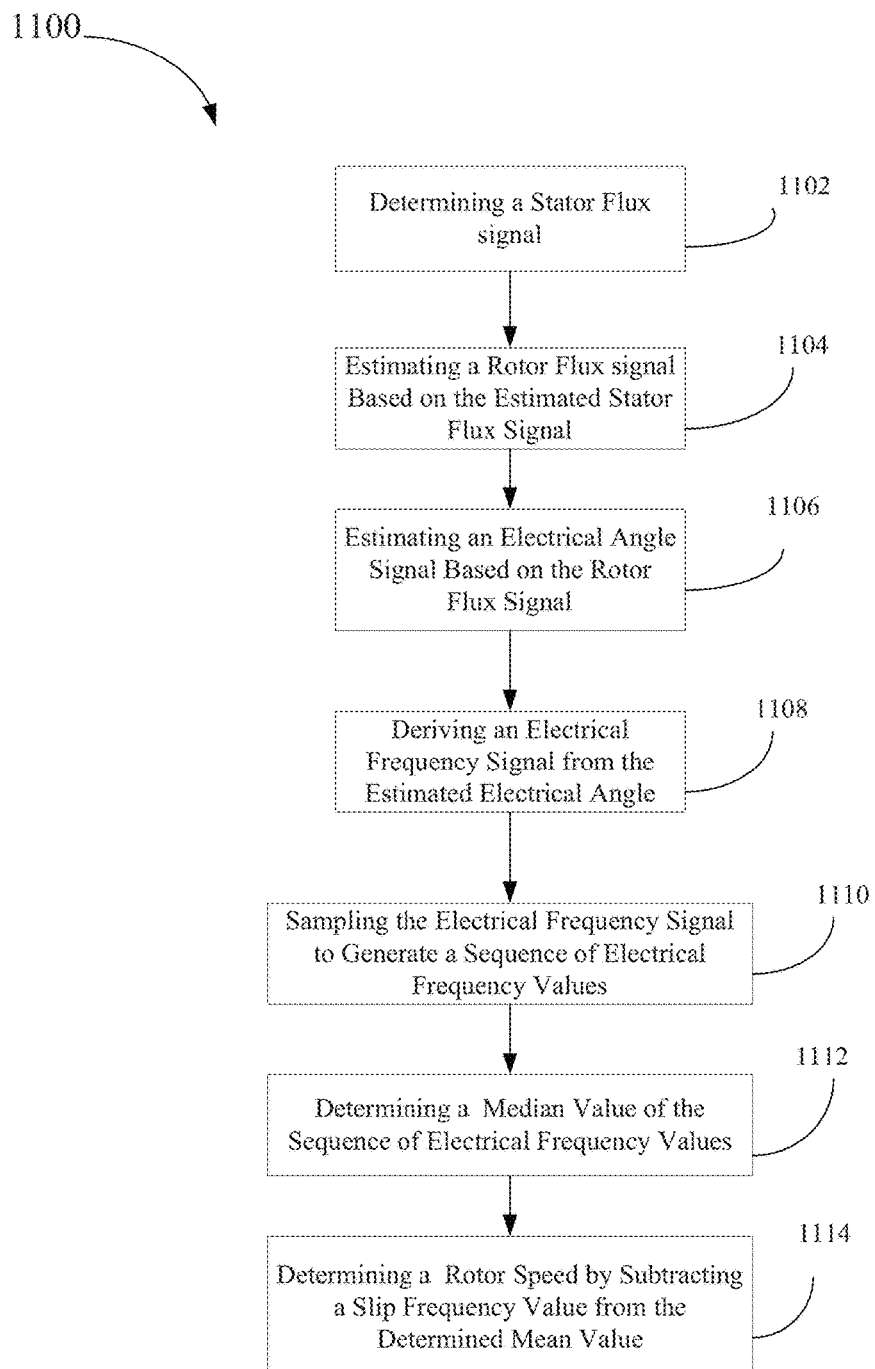
FIG. 11 is a flow chart illustrating a method for estimating the rotor speed of the AC machine using a median value of a moving window.

In FIG. 11, a flow chart 1100 illustrating an embodiment of a method for estimating a rotor speed of an AC machine based on an electrical angle and using a median filter is shown. In one embodiment, at step 1102, computing system 101 is configured to generate speed and flux command signals $W^*_m$ and $\lambda^*_r$ and provide them from command signal unit 103 as inputs to field-oriented control unit 114, so as to trigger a determination of an estimate of stator flux signal $\hat{\lambda}_{qd,s}$. At step 1104, computing system 101 is configured to provide stator flux signal estimate $\hat{\lambda}_{qd,s}$ to rotor-flux estimating unit 120 to generate rotor-flux signal estimate $\hat{\lambda}_{qd,r}$. Subsequently, at step 1106, speed estimating unit 122 is configured to use rotor-flux signal estimate $\hat{\lambda}_{qd,r}$ and stator current signal $I_{qd,s}^s$ to generate an estimate of electrical angle $\hat{\rho}$ in order to derive an estimate of electrical frequency $\hat{W}_e$, at step 1108. In accordance with an embodiment, speed estimating unit 122 samples the estimated electrical frequency signal $\hat{W}_e$, to generate a sequence of electrical frequency values, at step 1110. Then, at step 1112, the sequence of electrical frequency values are provided to median filtering unit 306 to generate a median value, from which an estimate of a slip frequency value $\hat{W}_{slip}$ is deducted to produce an estimate value of a rotor speed $\hat{W}_m$, at step 1114.

Figure 12:
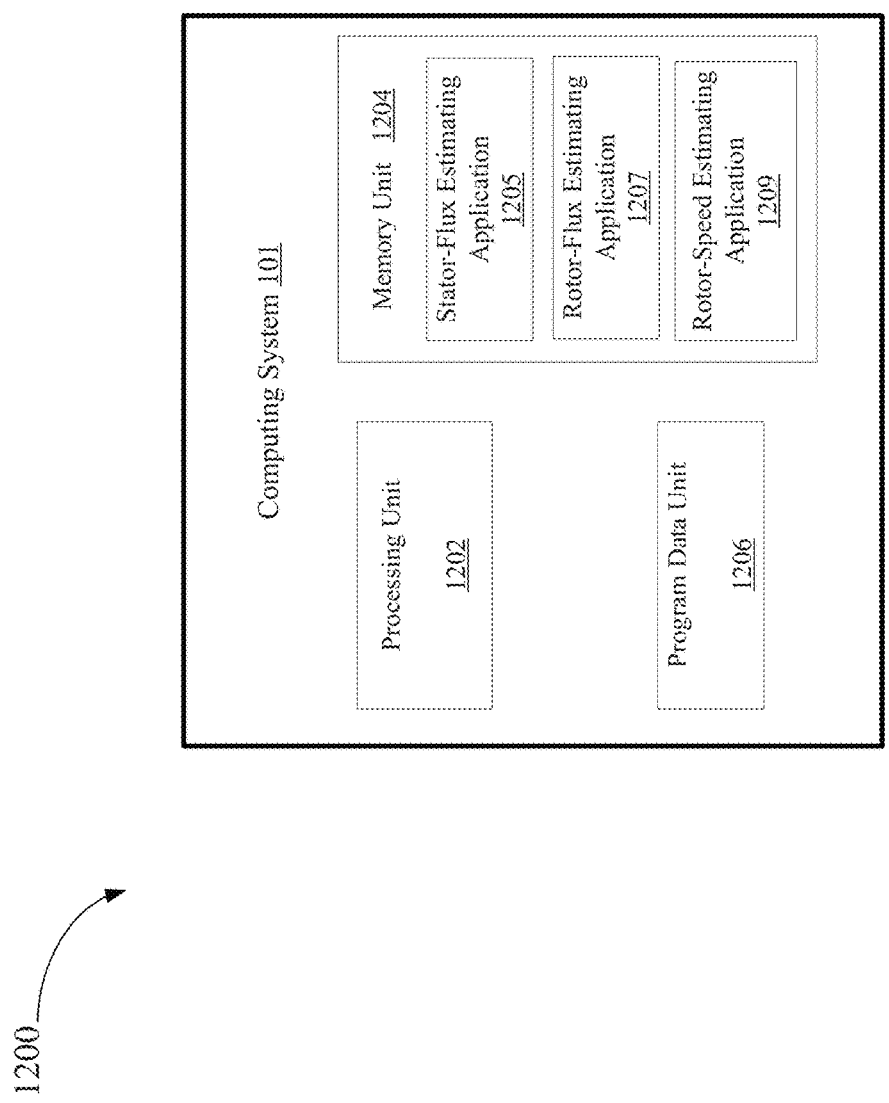
FIG. 12 is a diagram illustrating an example embodiment of a computing system.

FIG. 12 illustrates a schematic drawing of computing system 101 according to an exemplary embodiment. Computing system 101 includes a processing unit 1202, a memory unit 1204, and a program data unit 1206. Processor unit 1202 is configured to execute instructions and to carry out operations associated with computing system 101. For example, using instructions retrieved from memory unit 1204, processor unit 1202 may control the reception and manipulation of input and output data between components of computing system 101. Processing unit 1202 may include an integrated circuit that can be configured by the user, such as a field-programmable gate array (FPGA). The FPGA configuration is generally specified using a hardware description language (HDL). Processor unit 1202 can be implemented on a single-chip, multiple chips or multiple electrical components. For example, various architectures can be used for processor unit 1202, including dedicated or embedded processor or microprocessor (μP), single purpose processor, controller or a microcontroller (μC), application-specific integrated circuit (ASIC), any combination thereof, and so forth. In most cases, the processor unit together with an operating system operates to execute computer code and produce and use data.

Memory unit 1204 generally provides a place to store computer code and data that are used by computing system 101. Memory unit 1204 may include but not limited to non-volatile memory, such as read-only memory (ROM, flash memory, etc.), volatile memory, such as random-access memory (RAM), a hard disk drive and/or the like. In accordance with one embodiment, memory unit 1204 may include a stator-flux estimating program or application 1205, a rotor-flux estimating program or application 1207, and a rotor-speed estimating program or application 1209.

Figure 13:
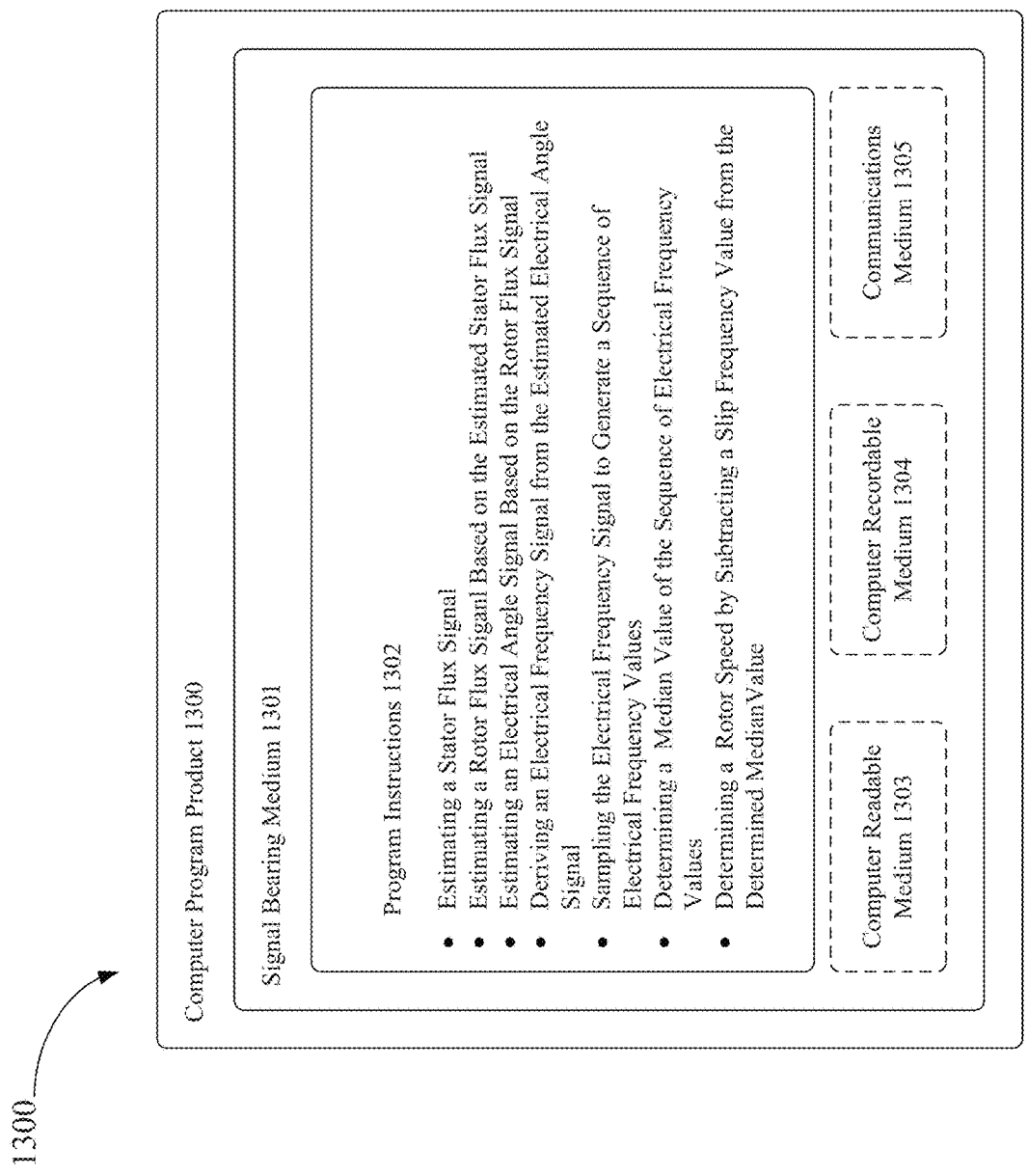
FIG. 13 is a schematic diagram illustrating a conceptual partial view of an example computer program associated with the method of FIG. 11 that uses a median value of a moving window.

In some embodiments, the disclosed method may be implemented as computer program instructions encoded on a non-transitory computer-readable storage media in a machine-readable format. FIG. 13 is a schematic illustrating a conceptual partial view of an example computer program product 1300 that includes a computer program for executing a computer process on a computing device, arranged according to at least some embodiments presented herein. In one embodiment, the example computer program product 1300 is provided using a signal bearing medium 1301. The signal bearing medium 1301 may include one or more programming instructions 1302 that, when executed by one or more processors may provide functionality or portions of the functionality described above with respect to FIG. 12. Thus, for example, referring the embodiment shown in FIG. 12, one or more features of blocks 1202, 1204, 1206, 1208, and/or 1210 may be undertaken by one or more instructions associated with the signal bearing medium 1301.

In some examples, the signal bearing medium 1301 may encompass a non-transitory computer-readable medium 1303, such as, but not limited to, a hard disk drive, a Compact Disc (CD), a Digital Video Disk (DVD), a digital tape, memory, etc. In some implementations, the signal bearing medium 1001 may encompass a computer recordable medium 1304, such as, but not limited to, memory, read/write (R/W) CDs, R/W DVDs, etc. In some implementations, the signal bearing medium 1301 may encompass a communications medium 1305, such as, but not limited to, a digital and/or an analog communication medium (e.g., a fiber optic cable, a waveguide, a wired communications link, a wireless communication link, etc.). Thus, for example, the signal bearing medium 1301 may be conveyed by a wireless form of the communications medium 1005 (e.g., a wireless communications medium conforming to the IEEE 802.11 standard or other transmission protocol).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method for estimating a rotor speed of an alternating current (AC) machine, comprising:
    determining a stator flux signal based on signals of voltage and current inputs to the AC machine;
    determining a rotor flux signal of the AC machine based on the determined stator flux signal;
    determining an electrical angle signal based on the determined rotor flux signal;
    deriving, with a processor, an electrical frequency signal from the determined electrical angle signal;
    sampling, with the processor, the derived electrical frequency signal at a predetermined sampling rate, and storing a predetermined number of electrical frequency sample values;
    generating, with a median filter, a median value of a sequence of the predetermined number of electrical frequency sample values by eliminating spikes in the electrical frequency sample values without altering step changes, wherein the median filter is configured to eliminate spikes in an angular derivative signal when the electrical angle signal is reset each cycle;
    evaluating, with the processor, the median value of the predetermined number of electrical frequency sample values;
    constantly monitoring stator current commands to the AC machine to determine a slip frequency value of the AC machine;
    outputting, with the processor, the rotor speed of the AC machine by subtracting the determined slip frequency value from the evaluated electrical frequency median value; and
    driving the AC machine based on the outputted rotor speed.

2. The computer-implemented method of claim 1, wherein determining a rotor flux signal of the AC machine based on the determined stator flux signal comprises:
    evaluating a difference between a result of a product of a stator resistance value with one of the current input signals and one of the voltage input signals to produce a difference signal;
    performing an integration of the produced difference signal, wherein the integration involves a discrete integrator having a sampling rate and a time delay;
    filtering using a high-pass filtering unit the integrated difference signal in order to minimize a potential accumulated offset value of the integrated difference signal;
    filtering the high-pass filtered difference using a low-pass filtering unit to extract a residual offset value from the high-pass filtered difference signal;
    reducing the high-pass filtered difference signal by subtracting the extracted residual offset value from the high-pass filtered difference signal; and
    determining the rotor flux signal based on the reduced high-pass filtered difference signal using a rotor flux derivation unit.

3. The computer-implemented method of claim 1, wherein evaluating the median value of the predetermined set of electrical frequency sample values comprises:
    removing data spikes that are generated by a periodic resetting of the electrical angle signal when varying between $-\pi$ radians and $+\pi$ radians.

4. The computer-implemented method of claim 1, wherein evaluating the median value of the predetermined set of electrical frequency sample values comprises:
    using the median filter involves a moving window of N digital samples and corresponding discrete delays.

5. The computer-implemented method of claim 4, wherein an additional low pass filtering unit is configured to filter output signals of the median filter in order to reduce noise signals, such as ripple noise signals.

6. The computer-implemented method of claim 4, wherein signals of voltage and current inputs to the AC machine are provided by a three-phase inverting unit, which is in turn coupled to a current controlling unit that monitors the signals of current inputs to the AC machine.

7. The computer-implemented method of claim 6, wherein inputs to the three-phase inverting unit are determined based on the determined electrical angle signal and command input signals provided via a field-oriented control unit.

8. The computer-implemented method of claim 7, wherein the command input signals include rotor speed and flux command signals.

9. A computing system, comprising:
    one or more computers and one or more storage devices storing instructions that are operable, when executed by the one or more computers, to cause the one or more computers to perform a method for estimating a rotor speed of an alternating current (AC) machine, the method comprising:
  determining a stator flux signal based on signals of voltage and current inputs to the AC machine;
  determining a rotor flux signal of the AC machine based on the determined stator flux signal;
  determining an electrical angle signal based on the determined rotor flux signal;
  deriving, with a processing unit, an electrical frequency signal from the determined electrical angle signal;
  sampling, with the processing unit, the derived electrical frequency signal at a predetermined sampling rate, and storing a predetermined number of electrical frequency sample values;
  a median filter configured to generate a median value of a sequence of the predetermined number of electrical frequency sample values by eliminating spikes in the electrical frequency sample values without altering step changes, wherein the median filter is configured to eliminate spikes in an angular derivative signal when the electrical angle signal is reset each cycle;
  evaluating, with the processing unit, the median value of the predetermined of electrical frequency sample values;
  constantly monitoring stator current commands to the AC machine to determine a slip frequency value of the AC machine;
  outputting, with the processing unit, the rotor speed of the AC machine by subtracting the determined slip frequency value from the evaluated electrical frequency median value; and
  driving the AC machine based on the outputted rotor speed.

10. The computing system of claim 9, wherein determining a rotor flux signal of the AC machine based on the determined stator flux signal comprises:
  evaluating a difference between a result of a product of a stator resistance value with one of the current input signals and one of the voltage input signals to produce a difference signal;
  performing an integration of the produced difference signal, wherein the integration involves a discrete integrator having a sampling rate and a time delay;
  filtering using a high-pass filtering unit the integrated difference signal in order to minimize a potential accumulated offset value of the integrated difference signal;
  filtering the high-pass filtered difference using a low-pass filtering unit to extract a residual offset value from the high-pass filtered difference signal;
  reducing the high-pass filtered difference signal by subtracting the extracted residual offset value from the high-pass filtered difference signal; and
  determining the rotor flux signal based on the reduced high-pass filtered difference signal using a rotor flux derivation unit.

11. The computing system of claim 9, wherein evaluating the median value of the predetermined set of electrical frequency sample values comprises:
  removing data spikes that are generated by a periodic resetting of the electrical angle signal when varying between $-\pi$ radians and $\pi$ radians.

12. The computing system of claim 9, wherein evaluating the median value of the predetermined set of electrical frequency sample values comprises:
  using the median filter involves a moving window of N digital samples and corresponding discrete delays.

13. The computing system of claim 12, wherein an additional low pass filtering unit is configured to filter output signals of the median filter in order to reduce noise signals, such as ripple noise signals.

14. The computing system of claim 12, wherein signals of voltage and current inputs to the AC machine are provided by a three-phase inverting unit, which is in turn coupled to a current controlling unit that monitors the signals of current inputs to the AC machine.

15. The computing system of claim 12, wherein inputs to the three-phase inverter are determined based on the electrical angle signal and command input signals provided via a field-oriented control unit.

16. The computing system of claim 15, wherein the command input signals include rotor speed and flux command signals.

17. A system for estimating a rotor speed of an alternating current (AC) machine, comprising:
  a coordinate transform unit configured to transform voltage and current signals into equivalent q-axis and d-axis stator current and voltage signals;
  a rotor-flux estimating unit configured to derive a rotor flux signal based on the equivalent q-axis and d-axis stator current and voltage signals;
  a median filter configured to generate a median value of a sequence of the predetermined number of electrical frequency sample values by eliminating spikes in the electrical frequency sample values without altering step changes, wherein the median filter is configured to eliminate spikes in an angular derivative signal when the electrical angle signal is reset each cycle;
  an estimating unit configured to determine, with a processing unit, an electrical angle signal based on the determined rotor flux signal, to derive an electrical frequency signal from the determined electrical angle signal, to sample the derived electrical frequency signal at a predetermined sampling rate, and storing a predetermined number of electrical frequency sample values, to evaluating the median value of the predetermined number of electrical frequency sample values, to constantly monitor stator current commands to the AC machine to determine a slip frequency value of the AC machine, to output the rotor speed of the AC machine by subtracting the determined slip frequency value from the evaluated electrical frequency median value; and to drive the AC machine based on the outputted rotor speed.

18. The system of claim 17, further comprising:
  a high-pass filtering unit for filtering an integrated difference signal in order to minimize a potential accumulated offset value of the integrated difference signal, wherein the integrated difference signal is obtained by performing an integration of an evaluated difference between a result of a product of a stator resistance value with one of the current input signals and one of the voltage input signals to produce a difference signal;
  a low-pass filtering unit for filtering the high-pass filtered difference to extract a residual offset value from the high-pass filtered difference signal;
  a rotor flux derivation unit for determining the rotor flux signal based on the high-pass filtered difference signal that is reduced by the extracted residual offset value.

19. The system of claim 17, further comprising:
  a three-phase inverting unit that communicates signals of voltage and current inputs to the AC machine.

20. The system of claim 19, further comprising:
a current controlling unit that monitors the signals of current inputs to the AC machine.

21. The system of claim 20, further comprising:
a command signal unit that provides speed and flux command signals to a field-oriented control unit, which in turn provides current command signals to the three-phase inverting unit via the current controlling unit.

22. The computer-implemented method of claim 1, wherein the electrical angle signal is based on a rotor flux angle.

* * * * *